R. W. & C. F. EIFERT.
ROAD DRAG.
APPLICATION FILED APR. 25, 1911.
1,023,421.
Patented Apr. 16, 1912.
2 SHEETS—SHEET 1.
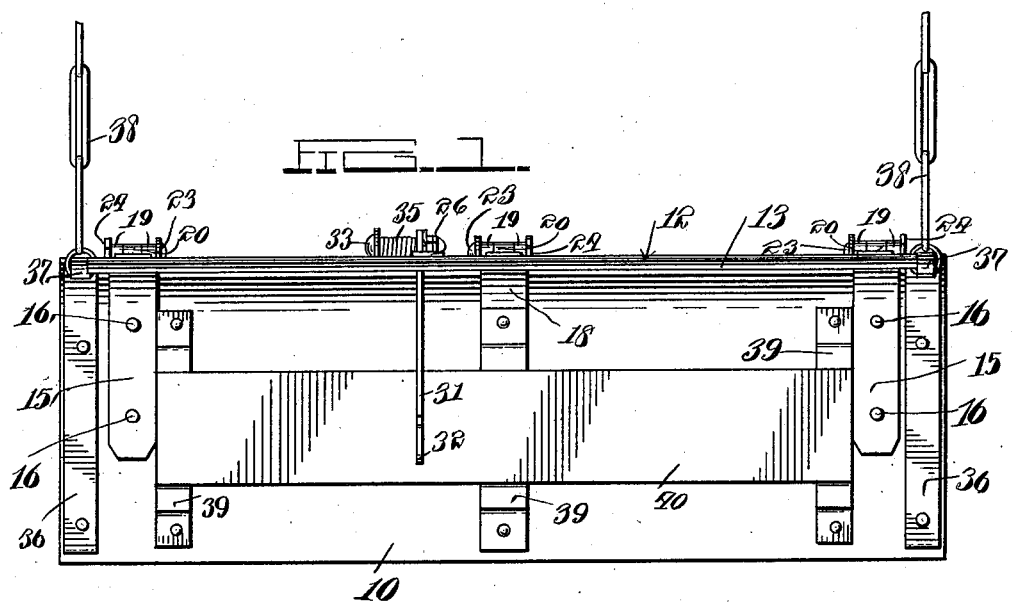
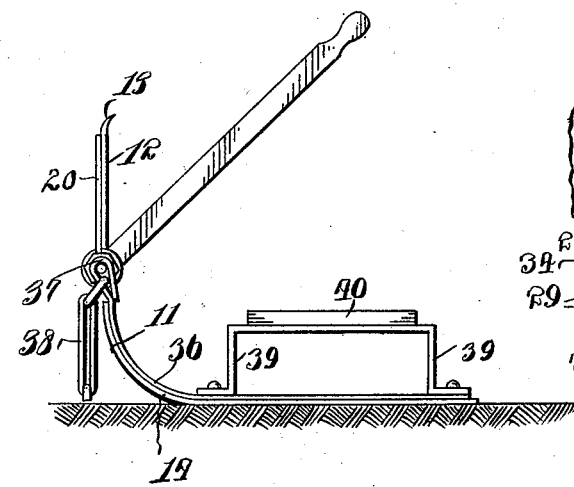
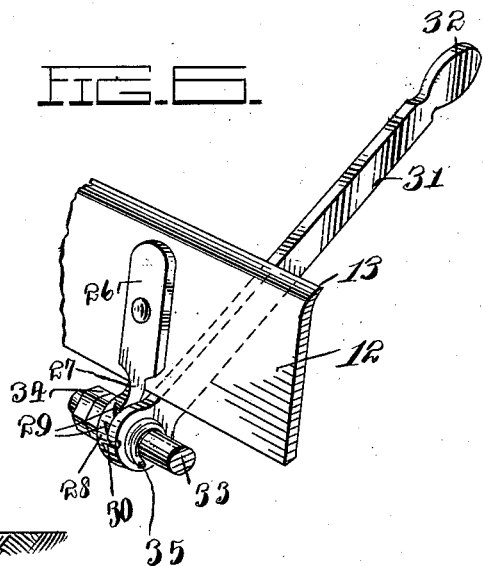
Witnesses
Inventors
R. W. Eifert.
and
C. F. Eifert.
By
Attorneys R. W. & C. F. EIFERT.
ROAD DRAG.
APPLICATION FILED APR. 25, 1911.
1,023,421.
Patented Apr. 16, 1912.
2 SHEETS—SHEET 2.
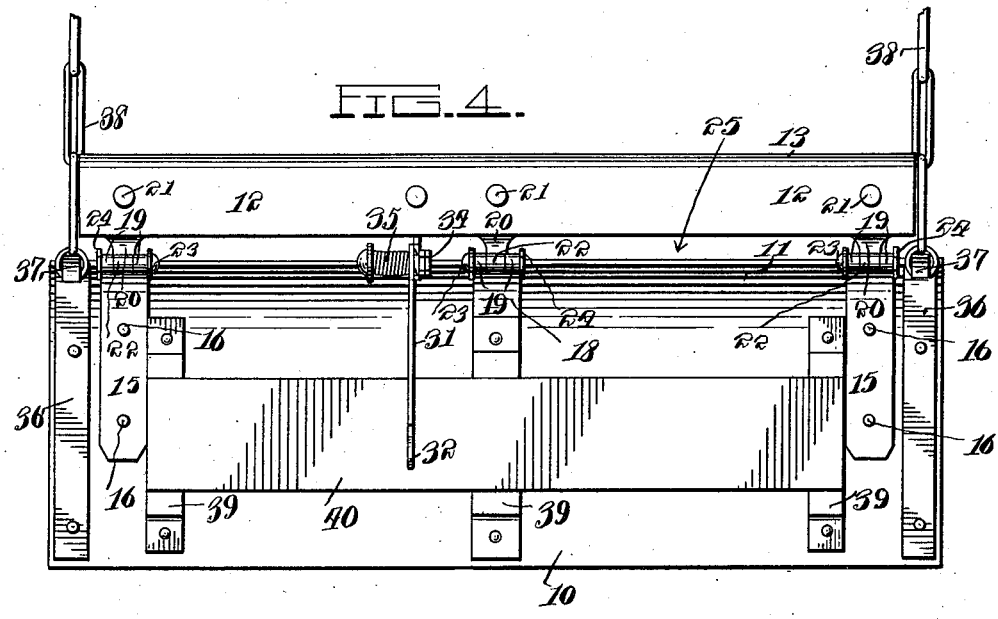
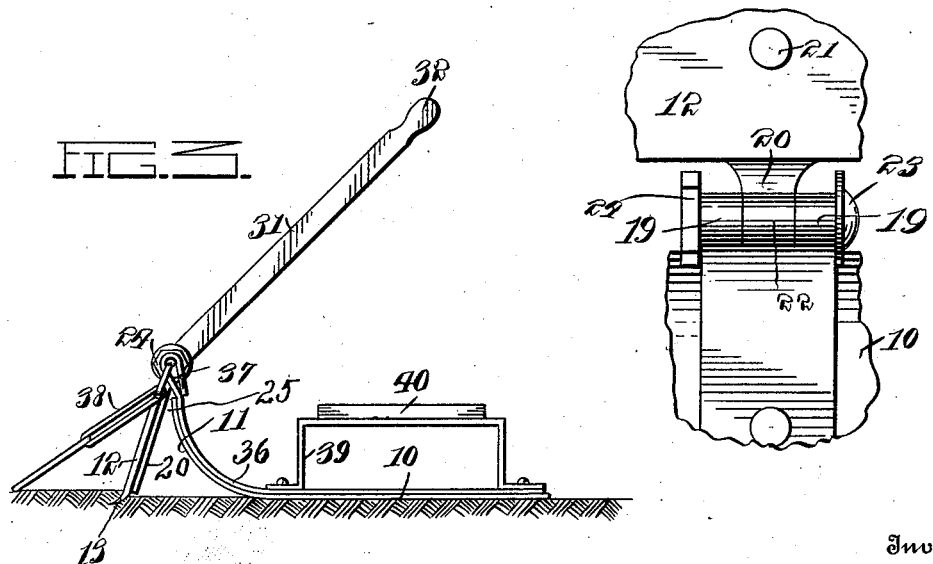
Witnesses
F. W. Taylor
J. P. Busch
Inventors
R. W. Eifert
and
C. F. Eifert
By
Attorneys

UNITED STATES PATENT OFFICE.

ROY W. EIFERT AND CARL F. EIFERT, OF HUNTSVILLE, ILLINOIS.

ROAD-DRAG.

1,023,421.  Specification of Letters Patent.   Patented Apr. 16, 1912.

Application filed April 25, 1911. Serial No. 623,211.

*To all whom it may concern:*

Be it known that we, ROY W. EIFERT and CARL F. EIFERT, citizens of the United States, residing at Huntsville, in the county of Schuyler, State of Illinois, have invented certain new and useful Improvements in Road-Drags; and we do hereby declare the following to be a full, clear, and exact description of the invention, such as will enable others skilled in the art to which it appertains to make and use the same.

This invention relates to road drags and the object of the invention is to provide an improved structure of this character adapted to be held in contact with the ground by the weight of the driver and which is provided with a pivotal blade member which may be moved to an operative or inoperative position at the will of the driver.

A further object of the invention is to provide a novel structure by which the cutting edge or blade is attached to the platform of the drag and novel means for holding the blade in an adjusted position.

With these and other objects in view, the invention consists of certain combinations and arrangements of parts, as will be hereinafter more fully described and claimed, it being a still further object to provide a device which will not be likely to get out of working order.

In the drawings:—Figure 1 is a top plan view of the device with the blade in a raised position. Fig. 2 is an end elevation thereof. Fig. 3 is a similar view but showing the blade in a lowered or operative position. Fig. 4 is a view similar to Fig. 1 but showing the blade in a lowered or operative position. Fig. 5 is an enlarged view of one of the hinge joints for the platform and scraper blade. Fig. 6 is a detail view of the adjusting means for the scraper blade.

Referring to the drawings in detail, there is shown a base-board or platform 10 which is preferably constructed of sheet metal and is of rectangular shape, the forward or operating side of the platform being bent upwardly as shown at 11, said upturned portion being curved from the platform to permit the dirt to feed thereunder. A scraper blade 12 is pivotally secured to the upper edge of the portion 11 for movement in the positions shown in Figs. 2 and 3 of the drawings whereupon its curved sharpened edge 13 will engage the earth or when in a raised position will permit the device to cross a bridge or other obstruction but preventing the same from catching in the obstruction. When the blade is in a lowered position for engagement with the earth, the curved formation of the upturned portion 11 will permit the dirt to freely pass under the platform and thereby prevent obstruction to the advancement of the drag and interference with the raising of the scraper blade by dirt gathering in front of the blade and platform, which would occur if the portion 11 was not formed with a curved lower portion 14 where bent up from the platform.

In order to pivotally attach the scraper blade 12 to the upper edge of the portion 11, we provide a pair of strap irons 15 which are securely riveted or otherwise fastened to the platform and upturned portion as shown at 16, said irons being disposed adjacent each end of the platform, while centrally of the platform we similarly attach a strap iron 18 which is extended to the rear edge of the platform, and each of said irons is provided with a bifurcated forward end which is bent up adjacent to the upturned portion 11 so as to form a pair of attaching ears 19 by turning the ends of the bifurcated portions of the irons. Strap irons 20 are securely riveted to the scraper blade 12 as shown at 21 and have reduced rear ends which are bent to form eyes 22 to extend between the eyes 19 of the bifurcated irons and secured in pivotal relation by pintle bolts 23 which are secured in position by nuts 24, thereby allowing proper pivotal movement of the scraper blade relative to the platform when moving to its operative and inoperative positions. It is of course understood that the irons 20 are similarly disposed relative to the irons 15 and 18 and by the connection thus formed, absolute rigidity is obtained and the parts are capable of free pivotal movement without any possibility of loosening of the hinge connections. When the scraper blade is in an operative position as shown in Fig. 4 of the drawings, sufficient space is left between the upper edge of the portion 11 and the adjacent edge of the scraper blade as shown at 25 to permit part of the dirt which will ride up the scraper blade to fall therethrough and subsequently pass under the platform.

In order to hold the scraper blade in different adjusted positions of inclination and to move the same into its operative and inoperative positions, a plate 26 is secured to the scraper blade upon its undersurface in a similar manner as the strap irons 20 and adjacent the central iron, said plate projecting rearwardly and having a twisted portion or shank 27 which is formed with a vertical ratchet plate 28. This plate 28 is circular in shape and provided with notches 29 adapted to be engaged by a sharpened projection 30 formed upon the adjacent circular end of the lever 31 which is provided with a gripping handle 32. A bolt 33 is engaged through openings in the coacting portions of the lever and plate 28 and secured in position by the nuts 34, said bolt having a coiled spring 35 mounted thereon between the lever and the head of the bolt so as to hold the projection 30 in engagement with the notches 29 thereby permitting the scraper blade to be moved to different positions, the spring permitting the lever to be moved to a disengaged position by a slight lateral movement at its upper end so as to allow the scraper blade to be lowered after it has been raised.

Strap irons 36 are secured adjacent each end of the platform 10 and upon its upper surface in a similar manner as the strap irons 15 and 18 and are formed with loops 37 at their upper ends adapted for attachment of a drag chain 38 for attachment of draft appliances. Also mounted upon the platform 10 are a series of angular supporting brackets 39, preferably three (3) in number and to which the board 40 is secured and upon which the driver stands in position for operating the lever 31 and also to hold the platform in contact with the ground by his weight, although it is obvious that any other manner of weighting the platform may be employed.

From the foregoing description it will be seen that the formation of the platform with an upturned and curved forward portion permits proper operation of the scraping blade by permitting the dirt to freely pass under the platform and also permits the raising of the blade by the lever in a ready manner. The adjustment of the scraper blade is also accomplished in a simple manner and the hinge connections are such as will rigidly hold the parts in proper relation for free pivotal movement of the scraper blade.

We claim:

1. In a road drag, a platform adapted to engage the earth and having an upturned curved forward portion, a scraper blade having a sharpened forward engaging edge, said scraper blade being pivotally connected to the upper edge of the curved portion and extending forwardly thereof, said pivotal connections also forming bracing means for the platform and blade and means carried by the blade for adjusting it at various angles relative to the earth and raising the same to an inoperative position.

2. A road drag comprising a metallic platform having an upwardly extended forward portion, a scraper blade, pivotal connections for the blade and platform and forming strengthening means therefor, a drag chain secured to the ends of the platform, a lever operatively supported by the scraper blade at its upper edge which is spaced from the forward edge of the platform, to permit pivotal movement thereof and a standing board supported upon the platform for an operator to permit operation of the lever.

In testimony whereof, we affix our signatures in presence of two witnesses.

ROY W. EIFERT.
CARL F. EIFERT.

Witnesses:
W. A. KIEFER,
R. H. MEAD.

---

Copies of this patent may be obtained for five cents each, by addressing the "Commissioner of Patents, Washington, D. C."